United States Patent
Maier et al.

(10) Patent No.: US 11,494,469 B2
(45) Date of Patent: Nov. 8, 2022

(54) OWNERSHIP ASSIGNMENT FOR A COMMUNICATION SYSTEM COMPONENT

(71) Applicant: INTERNATIONAL BUSINESS MACHINES CORPORATION, Armonk, NY (US)

(72) Inventors: Albert Maier, Tuebingen (DE); Thomas Schwarz, Stuttgart (DE); Peter Gerstl, Holzgerlingen (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 16/861,704

(22) Filed: Apr. 29, 2020

(65) Prior Publication Data

US 2021/0342421 A1 Nov. 4, 2021

(51) Int. Cl.
*G06F 21/31* (2013.01)
*G06N 20/00* (2019.01)

(52) U.S. Cl.
CPC .............. *G06F 21/31* (2013.01); *G06N 20/00* (2019.01)

(58) Field of Classification Search
CPC ...... G06F 21/31; G06F 21/645; G06F 16/219; G06F 16/2474; G06F 21/604; G06N 20/00; H04L 9/3247; H04L 9/3239
See application file for complete search history.

(56) References Cited

U.S. PATENT DOCUMENTS

| | | | |
|---|---|---|---|
| 8,090,624 B2 | 1/2012 | Reid et al. | |
| 9,171,283 B2 | 10/2015 | Curbera et al. | |
| 10,175,979 B1* | 1/2019 | Elwell | G06F 8/71 |
| 2015/0058278 A1 | 2/2015 | Fankhauser et al. | |
| 2015/0254232 A1* | 9/2015 | Ahmed | G06F 16/367 704/9 |
| 2017/0046664 A1* | 2/2017 | Haldenby | G06Q 20/4016 |
| 2017/0046792 A1* | 2/2017 | Haldenby | G06F 21/62 |
| 2017/0091662 A1 | 3/2017 | Sanchez et al. | |
| 2018/0276415 A1* | 9/2018 | Barday | G06F 21/6254 |
| 2019/0179949 A1* | 6/2019 | Gerstl | G06F 16/285 |
| 2019/0188700 A1* | 6/2019 | August | H04L 9/0825 |
| 2019/0188701 A1* | 6/2019 | Parsons | G06Q 20/3827 |
| 2020/0382510 A1* | 12/2020 | Dunjic | G06F 21/645 |
| 2021/0037008 A1* | 2/2021 | Swaminath | H04L 9/3255 |
| 2021/0271662 A1* | 9/2021 | Muse | G16H 10/60 |
| 2022/0075900 A1* | 3/2022 | Yan | G06F 21/604 |

* cited by examiner

*Primary Examiner* — Tongoc Tran
(74) *Attorney, Agent, or Firm* — Michael A. Petrocelli

(57) ABSTRACT

The present disclosure relates to assigning an ownership of a first component of a communication system. A processor may identify a second component of the communication system having a relationship to the first component. The processor may identify an owning entity of the second component, the owning entity may have ownership of the second component, and the communication system may include the owning entity. The processor may generate an owner information, the owner information may relate the owning entity of the second component to the first component. The processor may provide the owner information to the communication system. In response to the providing of the owner information, the processor may receive a command for assigning the ownership of the first component to the owning entity. In response to receiving the command, the processor may assign the ownership of the first component to the owning entity.

20 Claims, 5 Drawing Sheets

OWNERSHIP ASSIGNMENT FOR A COMMUNICATION SYSTEM COMPONENT

BACKGROUND

The present disclosure relates generally to the field of digital computer systems, and more specifically to assigning ownership of a first component of a communication system to an entity of the communication system.

In communication systems, especially those used in large enterprises, a large number of data elements are created and processed. Data elements may be stored in the form of data lakes. The data lakes may be used for decision making, for developing machine learning models, or for generation of new data elements. The data elements may have properties which may be adapted to the changing needs of the enterprises using the data lakes.

SUMMARY

Embodiments of the present disclosure include a method, computer program product, and system for assigning an ownership of a first component of a communication system. A processor may identify a second component of the communication system having a relationship to the first component. The processor may identify an owning entity of the second component, the owning entity having ownership of the second component, and the communication system including the owning entity. The processor may generate an owner information, the owner information relating the owning entity of the second component to the first component. The processor may provide the owner information to the communication system. In response to the providing of the owner information, the processor may receive a command for assigning the ownership of the first component to the owning entity. In response to receiving the command, the processor may assign the ownership of the first component to the owning entity.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
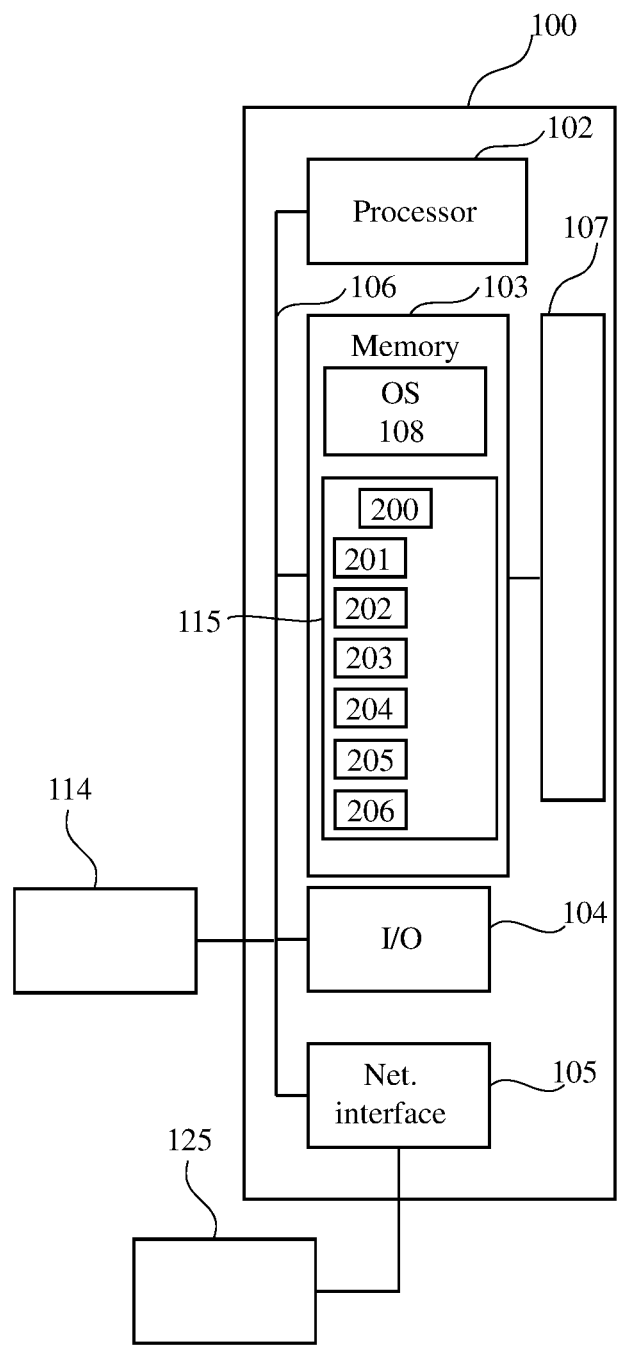
FIG. 1 depicts a first computer system for assigning ownership of a first component of a communication system, according to aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of digital computer systems, and more specifically to assigning ownership of a first component of a communication system to an entity of the communication system. The description of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In communication systems, especially those used in large enterprises, a large number of data elements are created and processed. Data elements may be stored in the form of data lakes. The data lakes may be used for decision making, for developing machine learning models, or for generation of new data elements. The data elements may have properties which may be adapted to the changing needs of the enterprises using the data lakes. However, many data elements of the data lakes are often not assigned to owners responsible for maintaining the respective data elements such that the properties of the data elements may be adapted to changing needs. Similarly, a nomenclature for labelling the data elements and rules for processing the data elements may be updated according to the changing environment of the enterprises. Nomenclature terms and rules may be assigned to owners who are able to perform such updates. Very often the terms of the nomenclature are not assigned to any owners. As in many cases data may comprise millions of data elements and nomenclature may comprise thousands of terms; thus, many resources (e.g., computing) are required to find appropriate entities of the communication system to which a respective ownership of one of the data elements or terms may be assigned.

Accordingly, proposed herein are a method, system, and computer program product to lessen the amount of resources required to assign ownership of data elements or terms. In some embodiments, a first component and a second component may each be a data element or a governance element. The data element may be designed in the form of a table, a vector or a matrix. The term "governance element" as used herein refers to an element of the communication system which may be used for specifying a processing of at least an exemplary data element of the communication system in a first case and/or for administrating the exemplary data element in a second case. In order to have an effect on the exemplary data element, the governance element may be assigned to the exemplary data element or vice versa.

In the first case, the governance element may be designed as a governance rule which may restrict the processing of the exemplary data element to an allowable set of actions of data processing or may specify certain conditions to be fulfilled for a given action of data processing with respect to the exemplary data element. The allowable set of actions of data processing may comprise copying the exemplary data element from one storage device of the communication system to another storage device of the communication system, reading and/or changing the exemplary data element.

According to an embodiment, the governance rule may be designed in the form of a protection rule relating to a protection of the exemplary data element which is assigned to the protection rule. The protection rule may provoke a protection algorithm if the exemplary data element may be processed within the communication system. The protection algorithm may comprise encrypting a content of the exemplary data element and/or restricting sending the exemplary data element to particular components of the communication system or external components.

In the second case, the communication system may comprise a nomenclature comprising terms for describing functions and/or purposes of data elements of the communication system, and the governance element may be one of the terms or a set of terms of the nomenclature. The terms of the nomenclature may be used for classifying the data elements and/or for searching the data elements, for example in a data lake of the communication system. The terms may describe the data elements in an intuitive manner and may help users to understand a meaning of the data elements with regard to their function and/or purpose within the communication system. In some cases, the data elements may each be assigned to one or more of the terms by a user of the communication system. The number of terms which the respective data element is assigned to may correlate with the importance of the respective data element. The higher the number is the higher the importance may be.

The term "component" as used herein may refer to a hardware component, a hardware element, a software component, a software element (for example, the data element), or an abstract component or element (for example, the governance element) of the communication system. An abstract component may be considered as a part of the communication system as it may influence a characteristic of the communication system. For example, if the governance element is one of the terms of the nomenclature, it may influence a type of communication within the communication system when using this term with respect to a search for one of the data elements. According to this example, the type of communication may be a characteristic of the communication system that may be influenced by the term. The data element may be related to a hardware component, such as a storage device or a processing unit, as the data element may influence a state of the hardware component, for example changing a bit of the storage device.

The term "entity" as used herein may refer to a hardware component, a hardware element, a software component, a software element or an abstract component or element of the communication system. In one example, the owning entity may be designed in the form of an exemplary computer system, e.g., a hardware component or hardware element of the communication system, comprising the ownership of the second component. In this example, the exemplary computer system may enable a user or a machine logged into the exemplary computer system to change properties of the second component. The machine may be an automated computer system, preferably an artificial intelligence system. In another example, the owning entity may be designed in the form of a software module, e.g., a software component or element, comprising a function for changing the properties of the second component. An example of the owning entity being an abstract component or element of the communication system may be the user being logged into the exemplary computer system and being authorized to change the properties of the second component. In another example, the owning entity may be a network of computers which may be considered as an organizational element of the communication system. In this example, at least one of the computers of the network may have the rights to change the properties of the second component.

Having ownership of the first or second component may include having rights to change the properties of the first and second component respectively. Furthermore, having ownership of the first or second component may include a right to specify if the first and second component, respectively, may be readable for certain parties of the communication system. In this case, being readable for the certain parties may include having the right to read the properties of the first and second component, respectively. Having ownership of the first and second component may allow specifying that certain parties being able to read the first and second component, respectively. Having ownership of the first or second component may include having any type of right applicable to the first and second component, respectively, within the communication system. The types of rights applicable to the first and second component within the communication system may depend on a structure or purpose of the communication system.

The phrase "rights to change" the properties of the first or second component as used herein may refer to a right to write on a first storage space and a second storage space, respectively, where the first storage space may store the properties of the first component and the second storage space may store the properties of the second component. The phrase "rights to change the properties" of the first and second component may be considered as "writing rights" applicable to the first and second component, respectively, as known in the context of directory systems of computers. The properties of the first or the second component may include being accessible by additional components of the communication system.

In response to assigning ownership of the first component to the owning entity, the owning entity may have the rights to change the properties of the first component and/or to specify which party of the communication system may be able to read the first component. In one example, the owning entity may still have ownership of the second component in response to assigning ownership of the first component to the owning entity. In another example, the owning entity may no longer have ownership of the second component in response to assigning ownership of the first component to the owning entity.

In the case that the first component is the data element, the properties of the first component may include content or an entry of the data element, such as a real or integer value or an alphabetic character, a link from the data element to a first additional component of the communication system or a link from the first additional component to the data element and/or a labeling of the data element. The same may apply to the second component if the second component is the data element.

In the case that the first component is the governance element, for example one of the terms of the nomenclature, the properties of the first component may include a labeling of this term or a link from this term to a second additional component of the communication system, wherein the link may be used to describe the second additional component by means of this term. Furthermore, the properties may comprise various linkages from this term to further terms of the nomenclature. The linkages may relate to a hierarchy of the nomenclature, where the hierarchy assigns different levels to the terms. In another example, the properties may comprise examples to describe the second additional component this term may be linked to. The same may apply to the second component if the second component is the governance element.

The relationship of the second component to the first component may be in the form that the first and second component may be processed or created by the same component (for example, the same software module) of the communication system. In one example, the relationship of the second component to the first component may be that the first component may be processed or created by the second component, or vice versa. In another example, the relationship of the second component to the first component may be that a digital trace may lead from the second component to the first component, or vice versa. The digital trace may be a pointer pointing form the first component to the second component, or vice versa, or any data element comprising the first component or a link to the first component and referring to the second component, or vice versa.

Owner information may be designed as one of the data elements of the communication system containing information from which the owning entity of the second component may be identified and the first component may be identified. In such an embodiment, the owner information may be referred to as, or a part of, an owner information element. The owner information may indicate that the owning entity of the second component may be suitable as an owning entity of the first component.

In some embodiments, the owner information and/or owner information element may be provided by storing the owner information (element) in a storage device of the communication system. A command for assigning the ownership of the first component to the owning entity may be sent from a computer system of the communication system. The command may be initiated by a user of the computer system or by an additional machine. The additional machine may be an additional artificial intelligence system. In case the user initiates the command, the methods of the present disclosure allow an interaction of the user in the form that the user approving the owning entity being assigned to the first component. This interaction may be considered as an approval of the information given by the owner information element. Similarly, in case the machine initiates the command, this may be regarded as an approval of the information of the owner information element on the part of the machine.

In response to receiving the command, the ownership of the first component may be assigned to the owning entity. In some embodiments, this may be performed automatically by the communication system.

The present disclosure relates to methods, systems, and computer program products where an owner may be assigned to the first component by assigning the owning entity of the second component to the first component. The owning entity may be a suitable owning entity for the first component as the second component has a relationship to the first component. In addition, by identifying the second component and the owning entity and by generating the owner information element and providing the owner information element, at least some steps of assigning ownership to the first component may be performed in an automated manner, as these steps may be performed by a software module of the communication system. The steps of identifying the second component and identifying the relationship of the second component to the first component may be considered as finding the owning entity of the second component as an appropriate owning entity of the first component. If the data lake, in which the first and second component may be stored, contains thousands or more data elements this task may hardly be performed by humans.

In one example, the owning entity may be assigned the duty of being responsible for maintaining the first component such that the properties of the first component may be adapted to changes of the communication system. With the owning entity being assigned the rights to change the properties of the first component, the owning entity may be able to perform such maintenance. The maintenance may comprise an updating of the terms of the nomenclature, in case the first component is one of the terms of the nomenclature, or an updating of the entries of the data element, in case the first component is the data element. Furthermore, the maintenance may comprise linking the first component to a third additional component of the communication system. The third additional component may be one of the data elements or one of the terms of the nomenclature. Generally, the maintenance may comprise any change of the properties of the first component, preferably in response to the changes of the communication system or its environment.

According to an embodiment, the first component is the data element and the second component is the governance element, where the first component is assigned to the governance element and the governance element influences a scope of data processing of the first component. The communication system may comprise various governance elements. Depending on a state of the communication system, the number of governance elements, each assigned to an owner, may be significantly higher, for example at least five times higher, than the number of data elements being assigned to an owner. If the communication system is in such a state, it may be more efficient to start to identify at least one of the governance elements related to the data element and to identify the owner of this governance element, rather than starting to identify one exemplary data element of the data elements related to one of the governance elements and to identify the owner of this data element.

The chance that the owner of the governance element may be identified may be higher than the chance of identifying the owner of the exemplary data element as the exemplary data element may not be assigned to an owner. As described above, the governance element may be one of the terms or a set of the terms of the nomenclature or the governance rule. In the former case, the governance element may influence the scope of data processing of the first component if the term or the set of terms may be used to search for the data element and the data element is assigned to the terms or the set of terms. The data processing of the first component may comprise reading out the content of the data element in response to finding the data element by using the term or set of terms the data element is assigned to in a search for the data element. In the latter case, the governance element may influence the scope of data processing of the data element if the governance element restricts the scope of data processing of the first component to an allowable set of actions of data processing.

According to an embodiment, the first component is the governance element and the second component is the data element, where the second component is assigned to the governance element and the governance element influences a scope of data processing of the second component. This embodiment is similar to the last embodiment mentioned above, however, the first component is the governance element instead of the data element and the second component is the data element instead of the governance element. Accordingly, this embodiment may be beneficial if the number of governance elements each assigned to an owner is significantly lower, for example at least five times lower, than the number of data elements each being assigned to an owner. The manner that the governance element may influence the scope of data processing of the first component may be transferred to the manner the governance element may influence the scope of data processing of the second component.

In both above mentioned embodiments, the embodiment comprising the first component as the data element and the embodiment comprising the second component as the data element, the feature that the data element is assigned to, the governance element, may alleviate the need to find the appropriate owning entity of the first component. In many cases, the data element may be assigned to the governance element by a user of the communication system, e.g., a human being. Therefore, such a relation of the second component to the first component may be considered as approved by at least one human being. This relation may serve as a strong indicator for the owning entity of the second component being the appropriate owning entity of the first component.

According to an embodiment, the governance element comprises a term, where the term describes the data element. The term may be one of the terms of the nomenclature. The term may be used to find the appropriate owning entity of the first component faster as the term describes the data element. Furthermore, if the second component is the governance element, the chance that the owning entity of the second component may be the appropriate owning entity of the first component may be high.

According to an embodiment, the governance element comprises the governance rule, where the governance rule specifies the processing of the data element in the communication system. If the second component is the governance element, the owning entity is assigned the rights to change the governance rule. This may coincide with high influence with respect to the governance rule and any component of the communication system related to the governance rule. As the second component has a relation to the first component, the owning entity of the second component may be considered as a good choice for being the owning entity of the first component in this case. If the first component is the governance element and the second component is the data element, the owning entity of the data element may be considered as a more suitable owning entity of the first component than an additional owning entity of an additional data element which may not be related to the first component. Hence this embodiment may alleviate to find the appropriate owning entity of the first component.

According to an embodiment, the method further comprises generating the owner information element based on a record of a usage of the first component, where the record of the usage of the first component includes information about the usage of the first component with respect to the second component. The record of the usage of the first component may be stored within the communication system. According to this embodiment, the owner information element may be generated if the record of the usage is available within the communication system and may not be generated if the record of the usage is not available within the communication system.

The information about usage may include information for identifying the first and the second component and/or may include information about how the first component was used with respect to the second component. For example, if the second component is a user of the communication system, the information about the usage of the first component with respect to the second component may contain information indicating if the user rated or commented on the first component. If the record of usage of the first component is available within the communication system, this may be a strong indicator for the first component being related to the second component. Therefore, the owning entity of the second component may be considered as the appropriate owning entity of the first component.

According to an embodiment, the second component is a machine learning module and the relationship of the second component to the first component may be in the form of the first component being processed to develop the machine learning module. The owning entity of the machine learning module may be considered as an appropriate owning entity of the first component if the first component is or was processed to develop the machine learning module.

Developing the machine learning module (ML-module) may comprise training or testing of the ML-module. If the first component is the data element, the content of the data element may be read and processed to generate training and/or testing data for the training and testing, respectively.

The term "machine learning" refers to a computer algorithm used to extract useful information from input datasets and output datasets related to the input datasets. The machine learning may include the steps of training and testing of the machine learning module. The content of the data element may serve as data for constructing the input datasets and the output datasets. If the first component is the governance element, for example one of the terms, the term may be used to label the input or output datasets. If the first component is the governance rule, the governance rule may prescribe how the input and output datasets may be concatenated on the bases of an experimental database.

The information may be extracted by building probabilistic models in an automated way. The machine learning may be performed using one or more known machine learning algorithms such as linear regression, backpropagation, K-means, classification algorithms, etc. A performing of one of the machine learning algorithms is considered as training. A probabilistic model may, for example, be an equation or set of rules that makes it possible to predict a category from a set of categories on the basis of one of the input datasets or to group an instance corresponding to that input dataset into a cluster. The probabilistic model may be configured to provide a confidence score for each prediction or grouping it may perform. The confidence score of the prediction or the grouping may indicate the correctness of the prediction and the grouping respectively.

The term "module" as used herein refers to any known or in the future developed hardware, software (such as an executable program), artificial intelligence, fuzzy-logic or combination thereof for performing a function associated with the "module" or a result of having performed the function associated with the "module". For example, the ML-module may be a neural network.

According to an embodiment, the second component is a software development architecture, the relationship of the second component to the first component being in the form of the first component being processed by the software development architecture.

The software development architecture may comprise different software development platforms, each preferably comprising an assigned memory space on a processor, and/or different user interfaces assigned to a different software developer. The user interfaces may comprise different saved settings and routines each adapted to one of the software developers. The user interfaces may also be known as "notebooks." By means of the user interfaces and/or the software platforms, a type of processing of the first component may be performed, preferably by the developers.

The type of processing of the first component by means of the software development architecture may be its use for generating training and/or testing data sets for building a data analysis module. The data analysis module may comprise the above mentioned machine learning module. If the first component is processed by the software development architecture, the owning entity of the software development architecture may be considered as the appropriate owning entity of the first component. The owning entity of the software development architecture may have a high interest that the first component be updated frequently, according to the changes of the communication system, in the case that the owning entity is a user.

According to an embodiment, the second component is an application module of the communication system, where the relationship of the second component to the first component is in the form of the first component being processed by the application module. The first component being processed by the application module may be an indicator that the owning entity of the application module is the appropriate owning entity of the first component. The application module may comprise the above described data analysis module. The data analysis module may process the first component, preferably, by generating further data and/or by visualizing the content of the first component, in the case that the first component is the data element.

According to an embodiment, the second component is a data representation element, the relationship of the second component to the first component being in the form of the data representation element comprising the first component.

The data representation element may be designed as a document, a chart, a list or a table comprising the first component, for example, the content of the first component if the first component is the data element or one of the terms of the nomenclature or the governance rule if the first component is the governance element. The data representation element may be designed for performing decision processes and/or a data analysis which may influence a communication in the communication system. The communication may be designed as a visualization of the decision process and/or the data analysis by means of an output device. The data analysis may be used by humans to perform human-driven data analysis. Hence, the data representation element may play an important role in the communication system. It may be assumed that the owning entity of the data representation element may be selected with care. Therefore, the owning entity of the data representation element may be an appropriate owning entity of the first component.

According to an embodiment, the methods, systems, and computer program products of the present disclosure further comprise determining a quantity of usage of the first component in the communication system and generating the owner information element dependent on the quantity of the usage of the first component. For example, the quantity of usage (referred to as first quantity in the following) of the first component with respect to the machine learning module may be determined. If the first quantity is lower than a given threshold, the owner information element may not be generated. If the first quantity is higher than a given threshold, the owner information element may be generated. This embodiment may prevent the owner information element from being generated if the relationship of the second component to the first component is comparatively low.

According to an embodiment, the method further comprises generating the owner information element dependent on a type of relationship between the first component and the second component. The type of relationship may be a direct or an indirect relationship. In the latter case, the owner information element may not be generated, whereas in the former case, it may be generated.

According to an embodiment, the communication system comprises a hierarchy with at least a first lower level and a second upper level, where the first component is assigned to the first lower level and the second component is assigned to the second upper level. Information about the hierarchy is used to identify the second component. For example, a search may be performed searching only for components of the communication system assigned to at least one level higher than the first component and having the relationship to the first component.

According to an embodiment, the methods, systems, and computer program products of the present disclosure further comprise generating the owner information element based on a search history comprising searches for the first component and/or the second component. The search history may comprise search phrases. If the search phrases indicate the relationship of the second component to the first component, it may be concluded that the owning entity of the second component may be the appropriate owning entity of the first component.

According to an embodiment, a scope of the rights to change the first component is adapted to a scope of the relationship of the second component to the second component. The closer or stronger the relationship is, the higher the scope of the rights to change the first component may be according to this embodiment. For example, if the first component includes nomenclature only used by one specialized entity, and the communicating system identifies the second component as including the same nomenclature, there may be a strong relationship between the first and second component. Accordingly, the second component may be assigned ownership of the specialized entity and given the same accesses as the first component (e.g., use in a machine learning model, specialized analyses, etc.)

Turning now to the Figures, it is noted that like reference numerals are used to designate like parts in the accompanying drawings. FIG. 1 shows a first computer system 100 for assigning ownership of a first component 1 of a communication system 3. The first computer system 100 may be suited for performing method steps as described in the disclosure. The first computer system 100 may include a first processor 102, a first memory 103, a first I/O circuitry 104 and a first network interface 105 coupled together by a first bus 106. The first I/O circuitry 104 may be connected to a display 114. The first network interface 105 may be connected to an external device 125. The external device 125 may comprise an external network, such as the world wide web.

The first processor 102 may represent one or more processors (e.g. microprocessors). The first memory 103 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), or programmable read only memory (PROM). Note that the first memory 103 may have a distributed architecture, where various components are situated remote from one another, but may be accessed by the first processor 102.

The first memory 103 in combination with a first persistent storage device 107 may be used for local data and instruction storage. The first persistent storage device 107 includes one or more persistent storage devices and media controlled by the first I/O circuitry 104. The first persistent storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The first memory 103 may include one or more separate programs, each of which comprises an ordered listing of executable instructions for implementing logical functions, notably functions involved in examples. The software in the first memory 103 may also typically include a first suitable operating system (OS) 108. The first OS 108 essentially controls the execution of other computer programs for implementing at least part of methods as described herein.

Figure 2:
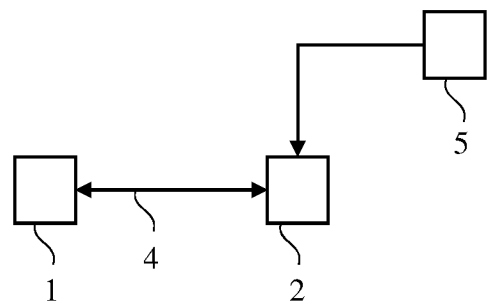
FIG. 2 depicts the first component, a second component and an owning entity of the second component, according to aspects of the present disclosure.

The first computer system 100 may be configured for a function (referred to as the first function in the following) such as identifying a second component 2 of the communication system having a relationship 4 to the first component 1, shown in FIG. 2. The relationship 4 is shown in FIG. 2 with two arrows. However, the relationship 4 may be designed in any form as described above, for example, such that a digital trace may lead from the first component 1 to the second component 2, or vice versa.

Furthermore, the first computer system 100 may be configured for a function (referred to as the second function in the following) such as identifying an owning entity 5 of the second component 2, where the owning entity 5 has ownership of the second component 2. The communication system 3 may include the owning entity 5.

Figure 3:
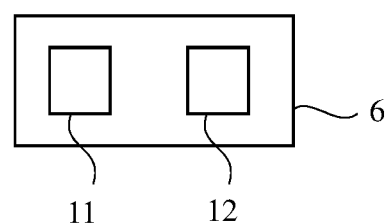
FIG. 3 depicts an owner information element, according to aspects of the present disclosure.

Referring to FIG. 3, illustrated is an owner information element 6 according to aspects of the present disclosure. The first computer system 100 may be configured for a function (referred to as the third function in the following) such as generating an owner information element 6 of the communication system 3, the owner information element 6 relating the owning entity 5 of the second component 2 to the first component 1. The owner information element 6 may comprise a first information 11 which may be used to identify or call the owning entity 5 and a second information 12 which may be used to identify of call the first component 1. The first information 11 and the second information 12 may be in the form of an address in the first memory 103 or first persistent storage device 107. The first and second information 11, 12, which are included in the owner information element 6, may indicate that the owning entity 5 of the second component 2 is suitable as an owning entity of the first component 1.

Furthermore, the first computer system 100 may be configured for providing the owner information element 6 (referred to as the fourth function in the following). The owner information element 6 may be provided by storing the owner information element 6 in the first memory 103 and/or in the first persistent storage 107.

Furthermore, the first computer system 100 may be configured for a function (referred to as the fifth function in the following) such as receiving a command for assigning an ownership of the first component 1 to the owning entity 5. The receiving of the command may be performed in response to providing of the owner information element 6. The command may be sent from an additional computer system of the communication system 3, such as the first end user workstation 36, shown in FIG. 4.

Furthermore, the first computer system 100 may be configured for a function (referred to as the sixth function in the following) such as assigning the ownership of the first component 1 to the owning entity 5. The assigning of the ownership of the first component 1 may be performed in response to receiving the command.

Referring back to FIG. 1, the first computer system 100 may perform the first, second, third, fourth, fifth and sixth function by executing a first program 201, a second program 202, a third program 203, a fourth program 204, a fifth program 205 and a sixth program 206, respectively. The first processor 102 may execute a main program 200. The main program 200 may initiate an execution of the program 201, 202, 203, 204, 205 and 206 on the first processor 102.

The term "program" as used herein refers to a set of instructions which contains commands to provoke actions performed by the first processor 102 when the first processor 102 may read the commands. The set of instructions may be in the form of a computer-readable program, routine, subroutine or part of a library, which may be executed by the first processor 102 and/or may be called by a further program being executed by the first processor 102. Preferably the programs 200, 201, 202, 203, 204, 205 and 206 may be executable programs which are compiled according to a type of hardware platform of the first computer system 100. The first memory 103 may comprise a space for storing the programs 200, 201, 202, 203, 204, 205, 206; the space hereinafter referred to as first function memory 115.

Figure 4:
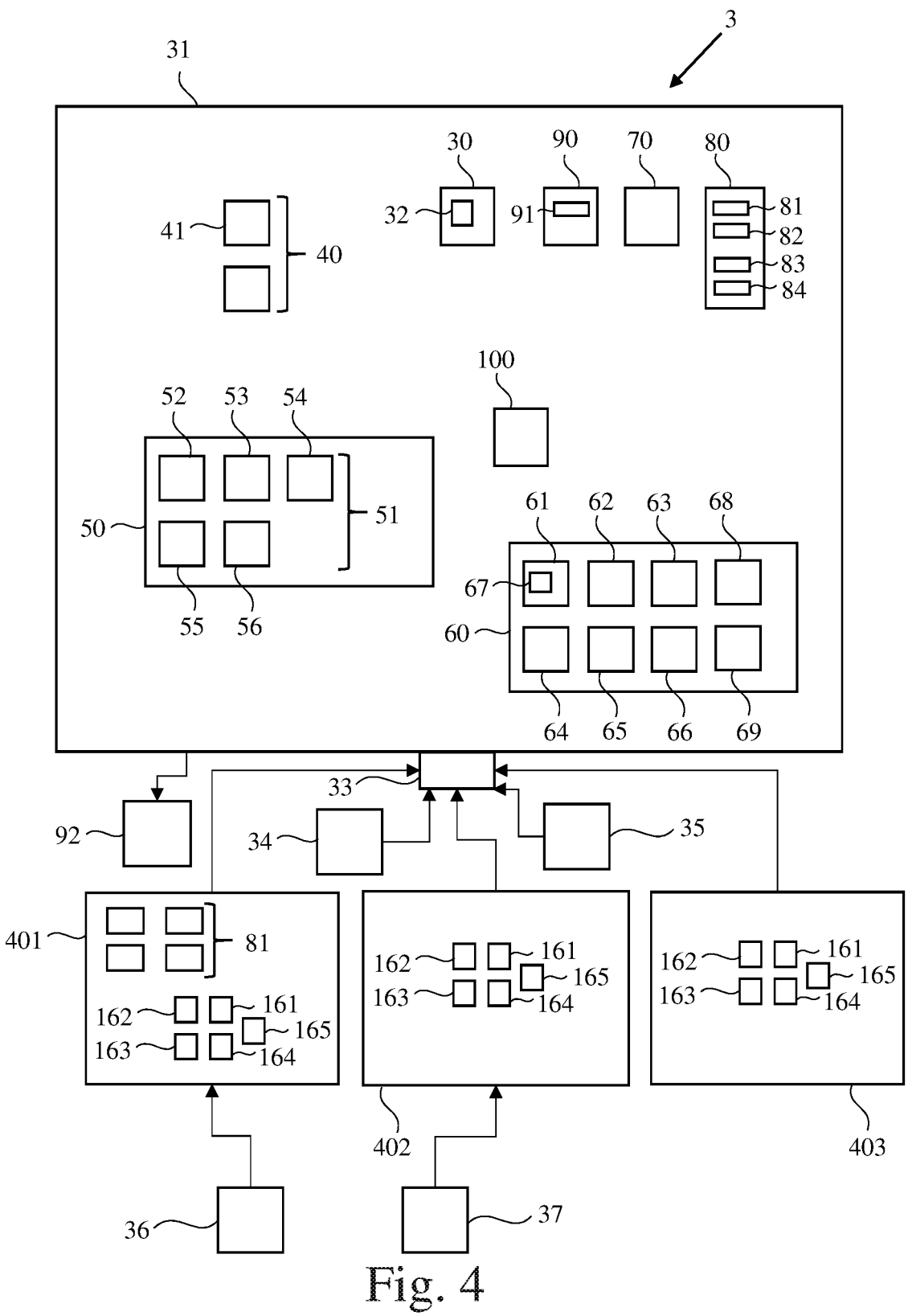
FIG. 4 depicts a block diagram for a communication system, according to aspects of the present disclosure.

FIG. 4 shows the communication system 3 which may comprise a central unit 31 and several user workstations. The central unit 31 may comprise components such as the first computer system 100, a documentation system 30, a set 40 of different machine learning modules, a first storage device 50 which may store data representation elements 51, a software development architecture 60, a search engine 70, a data lake 80 and a nomenclature archive 90 for storing, preferably maintaining, a nomenclature 91 of the communication system 3.

The data lake 80 may comprise data elements and/or governance elements. The data lake 80 may be in the form of a second persistent storage device storing the data elements 81-84 and/or the governance elements (not depicted) or in the form of a distribution of the data elements 81-84 and/or the governance elements being stored in distributed memory spaces within the communication system 3. The distributed memory spaces may comprise the first memory 103 and/or the first persistent storage device 107 and additional memory spaces and/or storage devices of additional computer systems of the communication system 3, such as one of the user workstations. The data elements 81-84 may comprise the above mentioned data element. The nomenclature 91 may comprise terms for describing the data elements 81-84, preferably with respect to their usage and/or purpose within in communication system 3. The governance elements may be in the form of the terms of the nomenclature 91 or governance rules assigned to at least a part of the data elements 81-84. The governance rules each may be designed according to one of the above described variants of the above mentioned governance rule.

The set of machine learning modules 40 may comprise a machine learning module 41 designed as the machine learning module described above. For example, the above described input datasets and the output datasets of the machine learning module 41 may be constructed using the first component 1.

The first storage device 50 may store documents 52, charts 53, lists 54, reports 55 about past communications in the communication system 3 or tables 56 as data representation elements 51. The reports 55 may comprise a set of diagnosis about an unsuccessful part of the past communications and a successful part of the past communications.

The software development architecture 60 may comprise a first software development platform 61 for developing the machine learning module 41, a second software development platform 62 for developing a first application 161 for generating at least one of the data representation elements 51, a third software development platform 63 for developing a second application 162 for using the search engine 70, a fourth software development platform 64 for developing a third application 163 for using the documentation system 30, a fifth software development platform 65 for developing a fourth application 164 and/or a sixth software development platform 66 for developing a fifth application 165. The applications 161, 162, 163, 164 and 165 may be designed each in the form of an application module.

The fourth application 164 may be a software directed to a technical purpose, for example construction of engineering parts or simulation of fluid flows. The software development platforms 61, 62, 63, 64, 65, 66 may each use a different memory space on the first persistent storage device 107 and on the first memory 103. Furthermore, the software development platforms 61, 62, 63, 64, 65, 66 may each be assigned to a first developer workstation 34 and/or a second developer workstation 35.

Furthermore, the communication system 3 may comprise a first, second and third application server 401, 402, 403. On the first, second and third application server 401, 402, 403 the first, second, third, fourth and fifth application 161, 162, 163, 164, 165 may be installed. The application servers 401, 402, 403 may comprise a first, second and third connection to the central unit 31, respectively, and additional connections to at least one of the developer workstations 34, 35 and/or a first end user workstation 36 and/or a second end user workstation 37. In one embodiment, each connection of the application servers 401, 402, 403 to the central unit 31 may enable a connection of the application servers 401, 402, 403 to the components of the central unit 31, preferably realized by a central communication port 33 of the central unit 31.

The communication system 3 may be used in the following manner. The fourth application 164 may be controlled and run by means of using the first end user workstation 36, which may be connected to the first application server 401. In response to running the fourth application 164, preferably on the first application server 401, first data elements 81 may be generated, preferably on the first application server 401. The first end user workstation 36 may be controlled by a first end user, for example an engineer. The fourth application 164 may generate the first data elements 81 in a structured manner, and the first data elements 81 may comprise different partitions, for example a first, second, third and fourth partition. The first data elements 81 may be added to the data lake 80 without having an owner assigned. The data elements 81-84 may include the first data elements 81.

In one example, the first end user workstation 36 or the first end user may be a first owning entity comprising the ownership of the fourth application 164. In this example, the fourth application 164 may be considered as the second component 2 and the first end user workstation 36 or the first end user may be considered as the owning entity 5 of the second component 2. The first data elements 81 may be regarded as a set of data elements and as the first component 1, according to this example. In this case, the owner information element 6 may relate the first end user workstation 36 or the first end user to the first data elements 81. The relationship of the second component 2 to the first component 1 may be in the form that the first data elements 81 may be processed, for example generated, by the fourth application 164, in the following referred to as first relationship.

The first data elements 81 may be labelled according to the nomenclature 91 and their usage in the communication system 3. Depending on the technical purpose of the fourth application 164, the terms of the nomenclature 91 may differ. In the following a fluid flow simulation of technical objects exposed to a fluid flow is assumed as the technical purpose. Hence, if the fourth application 164 may be run, the fluid flow simulation may be performed. According to this example, the terms of the nomenclature 91 may be terms such as "CAD-data," "inflow velocity," "outflow velocity," "number of nodes," "number of elements," "fluid flow solution," "pressure on first surface," "pressure on second surface," "boundary conditions" and "fluid flow data."

At least a part of the first data elements 81 may be assigned to at least one of the terms by using the first end user workstation 36. In one example, the first end user may assign the terms to the first data elements 81. However, in another example, the first data elements 81 may be assigned automatically to the terms, for example by running a shell script on the first end user workstation 36. The first data elements 81 may be assigned to two or three terms of the nomenclature 91. For example, one of the first data elements 81 may be assigned to the terms "fluid flow data," "boundary conditions," and "inflow velocity." Assigning each of the first data elements 81 to the terms of the nomenclature 91 may be referred to as labelling. The labelling may be performed using the fourth application 164, preferably in combination with running the above mentioned shell script.

The nomenclature 91 may comprise at least one hierarchy. The hierarchy may comprise different levels indicated for example by a parent term, child terms of first generation and, preferably, child terms of second generations. According to the previously described example the term "fluid flow data" may be a first parent term, the term "boundary conditions" may be a child term of the first generation and/or a second parent term, and the term "inflow velocity" may be a child term of the second generation. Similarly, the term "fluid flow solution" may be a child term of the first generation and/or a third parent term, and the terms "pressure on first surface" and "pressure on second surface" each may be a child term of the second generation.

The nomenclature archive 90 may store the terms of the nomenclature 91, their level of hierarchy, and/or relationships between the terms. Regarding the relationships between the terms, the nomenclature archive 90 may store that the term "boundary condition" is a child term of the first parent term "fluid flow data" and that the term "inflow velocity" is a child term of the second parent term "boundary condition." Similarly, the nomenclature archive 90 may store that the term "fluid flow solution" is a child term of the first parent term "fluid flow data" and that the terms "pressure on first surface" and "pressure on second surface" are each a child term of the third parent term "fluid flow solution."

The communication system 3 may comprise a connection between the nomenclature archive 90 and the second end user workstation 37. In one example, the second end user workstation 37 or a second end user controlling the second end user workstation 37 may be a second owning entity having ownership of the nomenclature archive 90. In this example, the nomenclature archive 90 may be considered as the second component 2, and the second end user workstation 37 or the second end user may be considered as the owning entity 5 of the second component 2. Furthermore, according to this example, the first data elements 81 may be considered as the first component 1. In this case, the owner information element 6 may relate the second end user workstation 37 or the second end user to the first data elements 81. A relationship of the nomenclature 90 to the first data elements 81 may be in the form that the data elements 81 may be assigned to the terms of the nomenclature 90, in the following referred to as the second relationship. The second owning entity may be considered as an appropriate owning entity of the first data elements 81, preferably if the first data elements 81 are assigned to the terms automatically by using the shell script.

Considering the levels of hierarchy, the nomenclature archive 90 may store that the term "fluid flow data" is assigned to a first level comprising proper parents, that the term "boundary condition" and the term "fluid flow solution" are each assigned to a second level comprising children of the first generation, and that the terms "inflow velocity," "pressure on first surface," and "pressure on second surface" are assigned to a third level comprising children of the second generation. The phrase "proper parent" means that the terms of the first level do not have parents and cannot be children of another term.

In one example, only the terms assigned to the first and second level may be assigned to an owning entity. In some embodiments, higher level terms may have a higher importance to the communication system 3 and may therefore be more often assigned to an owning entity than lower level terms. In this case, information of the nomenclature archive 90 about which term may be assigned to which level of the hierarchy may be used to assign an ownership to the terms not being assigned to an owning entity. For example, the terms assigned to the first and/or second level may be considered as the second component 2, and the second end user workstation 37 or the second end user may be considered as the owning entity 5 of the second component 2. The terms not assigned to an owning entity, for example the terms being assigned to the third level, may be considered as the first component 1, according to this example. In this case, the owner information element 6 may relate the second end user workstation 37 or the second end user to the terms being assigned to the third level. Here, the relationship of the second component 2 to the first component 1 may be in the form that both components may be part of the same hierarchy (in the following referred to as third relationship).

In another example, the first end user workstation 36 or the first end user may be a third owning entity having ownership of the first data elements 81. Furthermore, according to this example, the terms of the nomenclature 90 the first data elements 81 may not be an owning entity (or in some embodiments, assigned to an owning entity). In this example, the first data elements 81 may be considered as the second component 2, the first end user workstation 36 or the first end user may be considered as the owning entity 5 of the second component 2, and the terms of the nomenclature 90 may be considered as the first component 1. In this case, the owner information element 6 may relate the first end user workstation 36 or the first end user to the first data elements 81. This may be a practical application of the method if the first data elements 81 may not be assigned automatically to the terms by the shell script but may be assigned manually, for example by the first end user. The relationship of the first data elements 81 to the nomenclature 90 may be the same as the second relationship.

The fourth application 164 may generate the first data elements 81 such that the first data elements 81 which are assigned to the term "CAD-data" belong to the first partition, the first data elements 81 which are assigned to the term "boundary condition" belong to the second partition, the first data elements 81 which are assigned to the terms "number of nodes" and "number of elements" belong to the third partition, and the first data elements 81 which are assigned to the term "fluid flow solution" belong to the fourth partition.

The first end user workstation 36 may initiate a running of the third application 163 on the first application server 401 for using the documentation system 30. In response to running the third application 163, comments or ratings associated with the above mentioned partitions may be accessed, and by doing so the first data elements 81, which belong to the respective partitions may be recorded in a documentation file 32 by means of controlling the third application 163 via the first end user workstation 36. For example, a part of the first data elements 81 belonging to fourth partition, e.g., the first data elements 81 being assigned to the term "fluid flow solution," may be commented on by the first end user.

In one example, the first end user workstation 36 or the first end user may be a fourth owning entity comprising the ownership of the documentation file 32. In this example, the documentation file 32 may be considered as the second component 2, the first end user workstation 36 or the first end user may be considered as the owning entity 5 of the second component 2, and the first data elements 81 assigned to the term "fluid flow solution" may be considered as the first component 1. In this case, the owner information element 6 may relate the first end user workstation 36 or the first end user to the first data elements 81 belonging to the fourth partition. The relationship of the documentation file 32 to the first data elements 81 being to the term "fluid flow solution" may be in the form that the documentation file 32 may comprise an abstract describing the fluid flow solution, referred to as fourth relationship.

The first application server 402 may perform a communication with the documentation system 30 by running the third application 163. Via this communication, communication entries in the documentation file 32 may be generated, where the entries assign comments or ratings to at least a part of the first data elements 81, preferably with respect to the partition to which they belong.

The fifth application 165 may be software for performing data management in the communication system 3. The data management may comprise processing and/or transferring the first data elements 81 from one of the application servers 401, 402, 403 to the central unit 31, preferably to a data server of the central unit 31. The fifth application 165 may be controlled by the second end user workstation 37. The second end user workstation 37 may be controlled by a data steward.

The first data elements 81 may be processed differently according to the governance rules. In one example, the governance rules may provide a restriction to the first data elements 81 dependent on the term of the nomenclature 91 they are assigned to. For example, the first data elements 81 may be accessible to a selected portion of users in the communication system 3 dependent on the term of the nomenclature 91 they are assigned to. In another example, the governance rules may permit only a set of actions which may be applied on the first data elements 81 based on the term of the nomenclature 91 to which they are assigned.

In another example, the governance rules may provide conditions which need to be fulfilled under certain conditions for the first data elements 81, based on the term of the nomenclature 91 they are assigned to. For example, the governance rules may include a protection rule relating to protection of a selected part of the first data elements 81. For example, the first data elements 81 belonging to the first partition, e.g., the ones being labelled as "CAD-data," may be assigned to the protection rule by using the fifth application 165, preferably by the data steward. The protection rule may determine that each one of the first data elements 81 assigned to the protection rule are to be encrypted before transferring the respective data element from the first application server 401 to the central unit 31. Referring to the above described example, the first data elements 81 assigned to the term "CAD-data" would then need to be encrypted before being transferring to the central unit 31. In this way, the CAD-data may be protected.

With reference to the last two examples, the second end user workstation 36 or the data steward may be a fifth owning entity having ownership of the governance rules. In this example, the governance rules may be considered as the second component 2, and the second end user workstation 36 or the data steward may be considered as the owning entity 5 of the second component 2. The first data elements 81 assigned to the term "CAD-data" may be considered as the first component 1, in this example. In this case, the owner information element 6 may relate the second end user workstation 36 or the data steward to the first data elements 81 assigned to the term "CAD-data." The relationship of the second component 2 to the first component 1 may be in the form that these data elements are assigned to governance rules, referred to as fifth relationship.

By means of the first software development platform 61, the machine learning module 41 may be generated, preferably by training the machine learning module 41 using the input and output datasets. The first software development platform 61 may be controlled by the first developer workstation 34 and/or the second developer workstation 35, which may be controlled by a first and a second software developer, respectively. The first software development platform 61 may comprise a data analysis module 67 for selecting the input and output datasets from the first data elements 81.

The data analysis module 67 may enable the first and second software developer to analyze a space being spanned by values of the first data elements 81. By using the data analysis module 67, a selection of parts of the first data elements 81 which may be used to generate the input and output datasets may be performed. The data analysis module 67 may be designed to perform methods of design of experiment (e.g., selecting an input dataset with a highest confidence of identifying one component as related to another). The methods of design of experiment may automatically perform the selection of the parts of the first data elements 81 dependent on a type of a mathematical model the machine learning module 41 may comprise. These selected parts of the first data elements 81 are referred to as the fifth partition in the following.

In one example, the first developer workstation 34 or the first developer may be a sixth owning entity having ownership of the software development architecture 60, for example the ownership of the first software development platform 61. In this example, the software development architecture 60 or the first software development platform 61 may be considered as the second component 2, and first developer workstation 34 or the first developer may be considered as the owning entity 5 of the second component 2. The input and output datasets may be the first component 1 in this example. The input and output datasets may be stored in the data lake 80. In this case, the owner information element 6 may relate the first developer workstation 34 or the first developer to the input and output datasets. The relationship of the second component 2 to the first component 1 may be in the form that the input and output datasets may be processed (for example, generated) by means of the software development architecture 60, referred to as the sixth relationship.

The software development architecture 60 may comprise a first user interface 68 connecting the first developer workstation 34 with the software development architecture 60, preferably only with the first software development platform 61, and a second user interface 69 connecting the second developer workstation 35 with the software development architecture 60, preferably only with the first software development platform 61.

In addition, the first software development platform 61 may generate the machine learning module 41 such that a set of different mathematical models may be generated in a first stage. The mathematical models may each include a set of values of parameters and a set of functions. The mathematical models may include polynomial models and/or neural networks, such as, for example, multi-layer-perceptron networks or radial basis function networks. In one example, the machine learning module 41 may be trained using the different mathematical models and preferably using the different input and output datasets, preferably dependent on the type of mathematical model. The best performing mathematical model of the different mathematical models may be chosen to be part of the machine learning module 41 permanently.

In one example, the first developer workstation 34 or the first developer may be a seventh owning entity having ownership of the machine learning module 41. In this example, the machine learning module 41 may be considered as the second component 2, and the first developer workstation 34 or the first developer may be considered as the owning entity 5 of the second component 2. In this example, the mathematical models, the first data elements 81 or the input and output datasets may be the first component 1. The mathematical models may be stored in the data lake 80. In this case, the owner information element 6 may relate the first developer workstation 34 or the first developer to the mathematical models, the first data elements 81, or the input and output datasets. The relationship of the second component 2 to the first component 1 may be in the form that the mathematical models, the first data elements 81, or the input and output datasets may be processed (for example, generated or used) by means of the machine learning module 41, referred to as seventh relationship. The mathematical models may be generated by means of the machine learning module 41 by calculating gradients of the values of the parameters of the mathematical models.

The communication system 3 may comprise a fourth connection (not depicted) between the first end user workstation 36 and the second server 402. The first end user workstation 36 may control the first application 161 for generating data representation elements 51 on the second server 402, preferably provoked by commands sent by the first end user via the fourth connection. The controlling of the first application 161 may comprise selecting a part of the first data elements 81 such that information given by the selected part of the first data elements 81 may be included in at least one of the data representation elements 51.

In one example, the first end user workstation 36 or the first end user may be an eighth owning entity having ownership of the data representation elements 51. In this example, at least one of the data representation elements 51 may be considered as the second component 2, and the first end user workstation 36 or the first end user may be considered as the owning entity 5 of the second component 2. At least one of the first data elements 81 may be considered as the first component 1, in this example. In that case, the owner information element 6 may relate the first end user workstation 36 or the first end user to the one of the first data elements 81. The relationship of the second component 2 to the first component 1 may be in the form that at least one of the data representation elements 51 comprises at least one of the first data elements 81, referred to as eighth relationship in the following.

The communication system 3 may comprise a fifth connection between the first end user workstation 36 and the third server 403. The first end user workstation 36 may p controlling the second application 162 for using the search engine 70, preferably provoked by further commands sent by the first end user via the fifth connection. Controlling the second application 162 may comprise generating a search string comprising a name or further information to describe at least one of the first data elements 81 to be searched for, referred to as searched data element in the following. The search engine 70 may perform a comparison of the search string with the terms of the nomenclature 91 being assigned to the searched data element. The documentation system 30 may store a set of search strings being designed similarly as the described search string to build a search history with respect to the data elements 81-84 of the communication system 3.

In one example, the search engine 70 may use the different levels of hierarchy and the relationships the first data elements 81 are assigned to for finding the first data elements 81 to be searched for.

In one example, the first end user workstation 36 or the first end user may be a ninth owning entity having ownership of the search string. In this example, the search string may be considered as the second component 2, and the first end user workstation 36 or the first end user may be considered as the owning entity 5 of the second component 2. At least one of the first data elements 81 may be considered as the first component 1, in this example. In this case, the owner information element 6 may relate the first end user workstation 36 or the first end user to the one of the first data elements 81. The relationship of the second component 2 to the first component 1 may be in the form that the search string comprises at least one term describing at least one of the first data elements 81, referred to as ninth relationship in the following.

In another example, the communication system 3 may comprise a connection architecture which may be controlled and/or maintained by the second user workstation 37. The connection architecture may create links between the first data elements 81 among each other between the first data elements 81 and additional data elements including the data elements 81-84 of the data lake 80. For example, the connection architecture may generate a link between the first data elements 81 belonging to the first partition and the first data elements 81 belonging to the second partition. With respect to the above described example of the fluid flow simulation such a link may be considered as assigning certain boundary conditions to certain parts of the CAD-data.

In one example, the second end user workstation 36 or the second end user may be a tenth owning entity having ownership of the links generated by means of the connection architecture. In this example, at least one of the links may be considered as the second component 2, and the second end user workstation 36 or the second end user may be considered as the owning entity 5 of the second component 2. In this example, at least one of the first data elements 81 may be considered as the first component 1, for example the first data elements 81 belonging to the first and/or second partition. In this case, the owner information element 6 may relate the second end user workstation 36 or the second end user to the first data elements 81 belonging to the first and/or second partition. The relationship of the second component 2 to the first component 1 may be in the form that one of the links may link the first data elements 81 belonging to the first partition with the first data elements 81 belonging to the second partition, referred to as tenth relationship in the following.

The first, second, third, fourth, fifth, sixth, seventh, eighth, ninth and tenth relationship may be considered each as an example of how the first data elements 81 and/or terms of the nomenclature 91 may be used or processed within the communication system 3. The documentation system 30 may store information about the first, second, third, fourth, fifth, sixth, seventh, eighth, ninth and/or tenth relationship and/or the first, second, third, fourth, fifth, sixth, seventh, eighth, ninth and/or tenth owning entity. This type of information may be considered as first lineage information which may allow finding the appropriate owning entity of the first component 1 faster, e.g., to generate the owner information element 6 faster.

The first data elements 81 may represent one example of how data elements may be generated and processed on the communication system 3. The communication system 3 may comprise a set of different types of data elements, such as second data elements 82, third data elements 83 and fourth data elements 84, etc., which may refer each to additional different applications performed within the communication system 3. The data lake 80 may include the second data elements 82, third data elements 83, and fourth data elements 84. In a similar way that the documentation system 30 may comprise the first lineage information with respect to the first data elements 81 and the terms of the nomenclature 91, the documentation system 30 may comprise a second, third, and fourth lineage information corresponding to the second data elements 82, third data elements 83, and fourth data elements 84.

Figure 5:
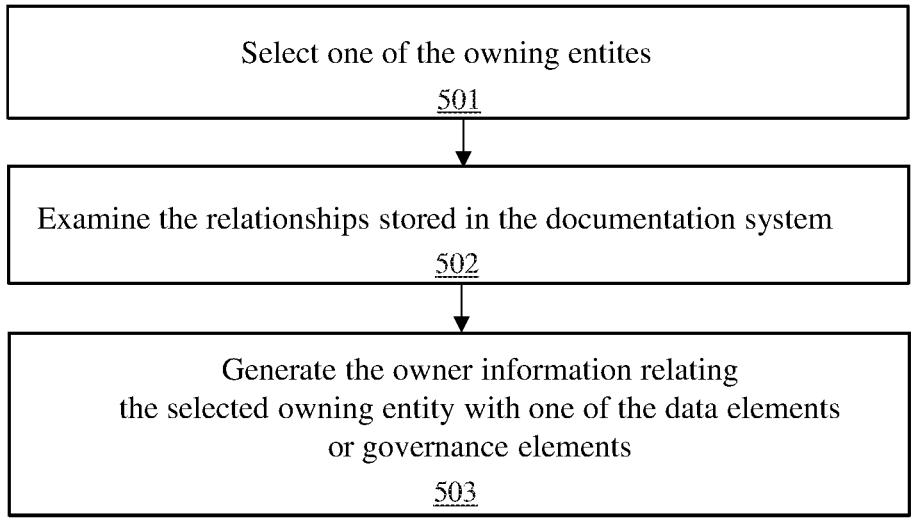
FIG. 5 shows a flowchart of methods to generate owner information, according to aspects of the present disclosure.

FIG. 5 depicts a flowchart of an exemplary method 500 to generate owner information of an owner information element 6 according to aspects of the present disclosure. In some embodiments, method 500 begins at operation 501. At operation 501, one of the owning entities, for example the first owning entity, may be selected, in the following referred to as selected owning entity. In some embodiments, method 500 proceeds to operation 502. At operation 502, the relationships stored in the documentation system 30 may be examined and checked to determine if at least one of the data elements 81-84 or governance elements may have a relationship to a component owned by the selected owning entity. For example, the first relationship may be examined and the first data elements 81 may be identified to have a relationship to the fourth application 164. In some embodiments, method 500 proceeds to operation 503. At operation 503, the owner information of owner information element 6 may be generated, which relates the selected owning entity, in this case the first end user workstation 36 or the first end user, with the first data elements 81. The first information 11 may identify the end user workstation 36 or the first end user, and the second information 12 may identify the first data elements 81, in this example. The first information 11 and the second information 12 may be displayed on a further output device 92. By reading the first and second information 11, 12, the second end user may be able to assign the ownership of the first component 1, in this case the first data elements 81, to the owning entity 5, in this case the first end user workstation 36 or the first end user.

Method 500 may similarly be performed and/or applied to one of the other owning entities, such as the second, third, fourth, fifth, sixth, seventh, eighth, ninth and/or tenth owning entity, instead of the first owning entity. Accordingly, one of the other relationships such as the second, third, fourth, fifth, sixth, seventh, eighth, ninth and/or tenth relationship, instead of the first relationship, may be examined, and the first component 1 and the second component 2 may be identified according to one of these relationships.

In one example, at least one of the first, second, third, fourth, fifth, sixth, seventh, eighth, ninth and/or tenth owning entity may be assigned to an additional organizational element of the communication system. The additional organizational element may comprise a further network of further computer systems. The additional computer systems may each be designed similarly to the first computer system 100.

Figure 6:
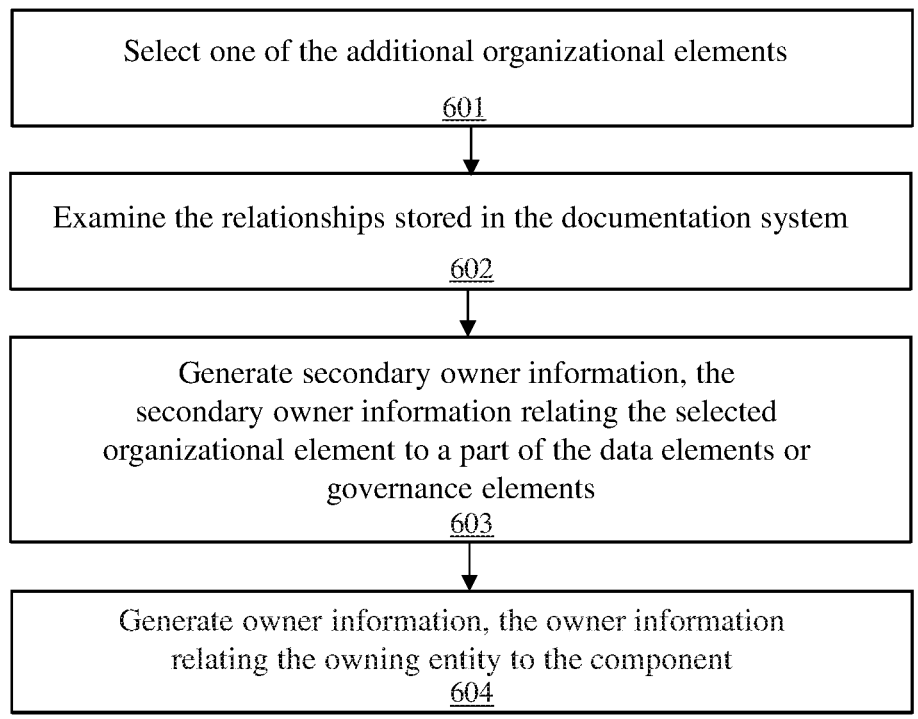
FIG. 6 shows a flowchart of methods to generate owner information, according to aspects of the present disclosure.

FIG. 6 depicts a flowchart of an exemplary method 600 to generate owner information of an owner information element 6 according to aspects of the present disclosure. In some embodiments, method 600 begins at operation 601. At operation 601, one of the additional organizational elements of the owning entities, for example, the first owning entity, may be selected, in the following referred to as selected organizational element. In some embodiments, method 600 proceeds to operation 602. At operation 602, the relationships stored in the documentation system 30 may be examined and checked to determine if at least one of data elements 81-84 or governance elements may have a relationship to a component assigned to the selected organizational element. For example, the first relationship may be examined and the first data elements 81 may be identified to have a relationship to the fourth application 164. The fourth application 164 may be assigned to one of the further organizational elements, which may be the selected organizational element, in this case. For example, the fourth application 164 may be assigned to a group of servers comprising the first, second and third application server 401, 402, 403. The group of servers may form one of the further organizational elements, in this case the selected organizational element. In some embodiments, method 600 proceeds to operation 603. At operation 603, secondary owner information of a secondary owner information element may be generated, the secondary owner information of the secondary owner information element relating the selected organizational element to a part of the data elements 81-84 or governance elements which have a relationship to the component being assigned to the selected organizational element.

In some embodiments, method 600 proceeds to operation 604. At operation 604, the owner information element 6 may be generated relating the owning entity by which the selected organizational element may be owned, in this case the first end user workstation 36 or the first end user, with the part of the data elements 81-84 or governance elements which have a relationship to the component being assigned to the selected organizational element, in this case the first data elements 81. The first information 11 may identify the end user workstation 36, or the first end user and the second information 12 may identify the first data elements 81, in this example. The second variant may generate the secondary owner information of the secondary owner information element as an additional step compared to the first variant and may use information about assignments to the further organizational elements. This may be a faster method to generate the owner information of the owner information element 6 if the data elements 81-84 and governance elements may be assigned to at least one of the further organizational elements and the further organizational elements may be assigned to one of the above mentioned owning entities.

Furthermore, the second variant may help to identify a second part of the data elements 81-84 and governance elements being assigned to more than one further organizational elements. In this case, the owner information of the owner information element 6 may be provided, but the ownership of the first component 1 may be not assigned to the owning entity 5. The second part of the data elements 81-84 and governance elements may be stored in a separated space of the documentation system 30 to enable a quick examination of the second part of the data elements 81-84 and governance elements. The second part of the data elements 81-84 and governance elements may be labelled as cross-organizational data elements and governance elements respectively. Furthermore, the second part of the data elements 81-84 and governance elements may be checked frequently with respect to the terms of the nomenclature 90 they are assigned to.

Figure 7:
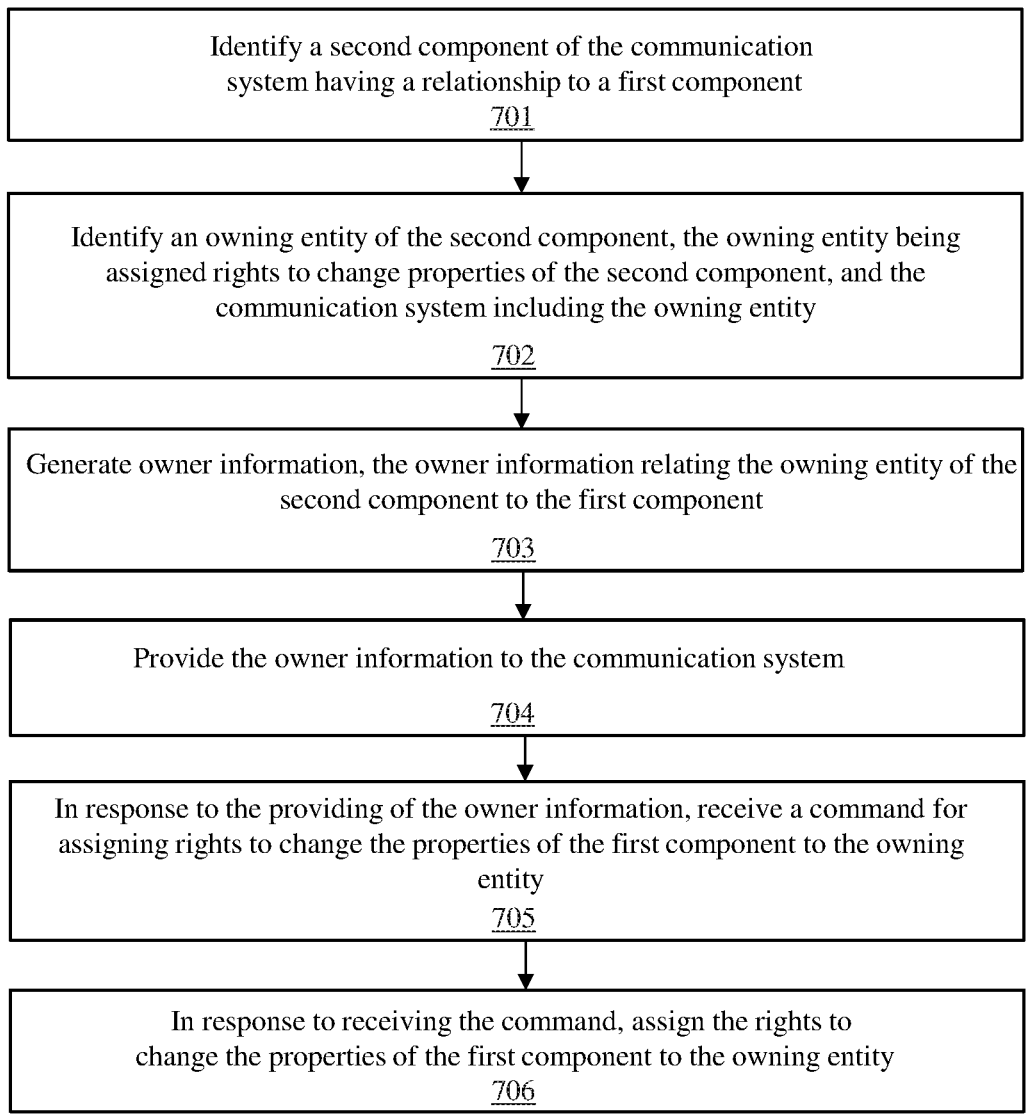
FIG. 7 shows a flowchart of a computer implemented method for assigning an ownership of a first component of a communication system, according to aspects of the present disclosure.

FIG. 7 shows a flowchart of a computer implemented method 700 for assigning the ownership of the first component 1 to the owning entity 5. In some embodiments, method 700 begins at operation 701. At operation 701, the second component 2 of the communication system 3 having a relationship to the first component 1 may be identified. In some embodiments, method 700 proceeds to operation 702. At operation 702, the owning entity 5 of the second component 2 may be identified, the owning entity 5 having ownership of the second component 2 and the communication system 3 comprising the owning entity 5. In some embodiments, method 700 proceeds to operation 703. At operation 703, owner information of the owner information element 6 of the communication system 3 may be generated, the owner information of the owner information element 6 relating the owning entity 5 of the second component 2 to the first component 1. In some embodiments, method 700 proceeds to operation 704. At operation 704, the owner information of the owner information element 6 may be provided to the communication system 3. In some embodiments, method 700 proceeds to operation 705. In response to the providing of the owner information of the owner information element 6, a command for assigning the ownership of the first component 1 to the owning entity 5 may be received at operation 705. In some embodiments, method 700 proceeds to operation 706. In response to receiving the command, the ownership of the first component 1 may be assigned to the owning entity 5 at operation 706.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method for assigning an ownership of a first component of a communication system, the method comprising:
   identifying, by a processor, a second component of the communication system having a relationship to the first component;
   identifying an owning entity of the second component, the owning entity having ownership of the second component, and the communication system including the owning entity;
   generating a search string comprising information to describe a first data element related to the first component;
   comparing the search string with terms of a nomenclature assigned to the first data element;
   determining relationships between components in the system including the first and second components and the owning entity;
   determining when the components in the system, including the first component, have a relationship to the owning entity;
   generating an owner information, the owner information relating the owning entity of the second component to the first component;
   providing the owner information to the communication system;
   receiving a command for assigning the ownership of the first component to the owning entity in response to providing the owner information; and
   assigning the ownership of the first component to the owning entity in response to receiving the command.

2. The method of claim 1, wherein the first component is a data element and the second component is a governance element, the first component being assigned to the governance element and the governance element influencing a scope of data processing of the first component.

3. The method of claim 1, wherein the first component is a governance element and the second component is a data element, the second component being assigned to the governance element and the governance element influencing a scope of data processing of the second component.

4. The method of claim 3, wherein the governance element comprises a term, the term describing the data element.

5. The method of claim 3, wherein the governance element comprises a governance rule, the governance rule specifying a processing of the data element in the communication system.

6. The method of claim 1, further comprising:
   generating the owner information based on a record of a usage of the first component, the record of the usage of the first component comprising information about the usage of the first component with respect to the second component.

7. The method of claim 1, wherein the second component is a machine learning module, the relationship of the second component to the first component being in the form of the first component being processed to develop the machine learning module.

8. The method of claim 1, wherein the second component is a software development architecture, the relationship of the second component to the first component being in the form of the first component being processed by the software development architecture.

9. The method of claim 1, wherein the second component is an application module of the communication system, the relationship of the second component to the first component being in the form of the first component being processed by the application module.

10. The method of claim 1, wherein the second component is a data representation element, the relationship of the second component to the first component being in the form of the data representation element comprising the first component.

11. The method of claim 1, further comprising:
    determining a quantity of usage of the first component in the communication system; and
    generating the owner information based on the quantity of the usage of the first component.

12. The method of claim 1, further comprising:
    generating the owner information based on a type of the relationship between the first component and the second component.

13. The method of claim 1, wherein the communication system comprises a hierarchy with at least a first lower level and a second upper level, the first component being assigned to the first lower level and the second component being assigned to the second upper level, wherein information about the hierarchy is used to identify the second component.

14. The method of claim 1, further comprising:
    generating the owner information based on a search history comprising searches for the first component and/or the second component.

15. The method of claim 1, wherein a scope of the rights to change the first component is adapted to a scope of the relationship of the second component to the second component.

16. A computer program product comprising a computer-readable storage medium having computer-readable program code embodied therewith, the program code executable by a processor to cause the processor to perform operations, the operations comprising:
    identifying a second component of the communication system having a relationship to the first component;
    identifying an owning entity of the second component, the owning entity having ownership of the second component, and the communication system including the owning entity;
    generating a search string comprising information to describe a first data element related to the first component;
    comparing the search string with terms of a nomenclature assigned to the first data element;
    determining relationships between components in the system including the first and second components and the owning entity;
    determining when the components in the system, including the first component, have a relationship to the owning entity;
    generating an owner information, the owner information relating the owning entity of the second component to the first component;

providing the owner information to the communication system;

receiving a command for assigning the ownership of the first component to the owning entity in response to providing the owner information; and assigning the ownership of the first component to the owning entity in response to receiving the command.

17. The computer program product of claim 16, wherein the first component is a data element and the second component is a governance element, the first component being assigned to the governance element and the governance element influencing a scope of data processing of the first component.

18. A system comprising:

a memory; and a processor in communication with the memory, the processor being configured to perform operations comprising:

identifying a second component of the communication system having a relationship to the first component;

identifying an owning entity of the second component, the owning entity having ownership of the second component, and the communication system including the owning entity;

generating a search string comprising information to describe a first data element related to the first component;

comparing the search string with terms of a nomenclature assigned to the first data element;

determining relationships between components in the system including the first and second components and the owning entity;

determining when the components in the system, including the first component, have a relationship to the owning entity;

generating an owner information, the owner information relating the owning entity of the second component to the first component;

providing the owner information to the communication system;

receiving a command for assigning the ownership of the first component to the owning entity in response to providing the owner information; and assigning the ownership of the first component to the owning entity in response to receiving the command.

19. The system of claim 18, wherein the first component is a governance element and the second component is a data element, the second component being assigned to the governance element and the governance element influencing a scope of data processing of the second component.

20. The system of claim 19, wherein the governance element comprises a term, the term describing the data element.

* * * * *